US006708159B2

(12) United States Patent
Kadri

(10) Patent No.: US 6,708,159 B2
(45) Date of Patent: Mar. 16, 2004

(54) FINITE-STATE AUTOMATON MODELING BIOLOGIC NEURON

(76) Inventor: Rachid M. Kadri, 11100 Louetta Rd., #815, Houston, TX (US) 77070

(*) Notice: Subject to any disclaimer, the term of this patent is extended or adjusted under 35 U.S.C. 154(b) by 326 days.

(21) Appl. No.: 09/846,053

(22) Filed: May 1, 2001

(65) Prior Publication Data

US 2002/0184174 A1 Dec. 5, 2002

(51) Int. Cl.[7] .............................................. G06F 15/18
(52) U.S. Cl. ........................................................ 706/17
(58) Field of Search ..................................... 706/17, 39

(56) References Cited

U.S. PATENT DOCUMENTS

| 5,226,092 A | 7/1993 | Chen ............................ 706/25 |
| 5,517,597 A | 5/1996 | Aparicio, IV et al. ........ 706/26 |
| 2002/0184174 A1 | 12/2002 | Kadri |

FOREIGN PATENT DOCUMENTS

| EP | 0560595 | 9/1993 |
| EP | 0834817 | 4/1998 |

OTHER PUBLICATIONS

Chen et al, "On Neural–Network Implementations of K–Nearest Neighbor Pattern Classifiers", IEEE Transactions on Circuits and Systems, Jul. 1997.*

* cited by examiner

Primary Examiner—George B. Davis
(74) Attorney, Agent, or Firm—Coats & Bennett, P.L.L.C.

(57) ABSTRACT

A finite state electrical automaton modeled after a human neuron comprises a plurality of weighted inputs that pass into a state computing unit. A feedback mechanism changes the weights of the inputs as needed to control the response of the automaton to a desired output. A clock signal allows the automaton to function as a discrete time system. Unlike the threshold gates, the present automaton is capable of outputting an n-bit digital value analogous to a cell membrane potential. Because this automaton is capable of outputting more than two simple states it is a better building block for building neural nets.

17 Claims, 3 Drawing Sheets

FINITE-STATE AUTOMATON MODELING BIOLOGIC NEURON

BACKGROUND OF THE INVENTION

1. Field of the Invention

The present invention is directed to an automaton for use as a logical building block, and particularly to an automaton suitable for use in a neural architecture.

2. Description of the Prior Art

Modern computing owes much of its logical structure to John Von Neumann, who incidentally hypothesized that circuits as complex as the human nervous system would never be realized. The logic structure that does pervade the computing world relies on one of two models. The first model is a simple all or nothing state model. Beginning with vacuum tubes and extending to the present transistors, the element is either on or off. Ones and zeros may be assigned to either state as needed, being consistent within the circuit. Multiple elements may be assembled to form gates. The gate reacts to input depending on its nature and provides an output of either on or off. Typical gates include AND, OR, XOR, NOT, or the like. While helpful for circuit design, this sort of logic is not conducive to the creation of automata capable of inferential decision making.

The second model was derived from the study of nerve cells and relies on threshold logic. Threshold logic implies that there is a gate, and when inputs to that gate meet or exceed the threshold, the gate is triggered and an output is generated. While functional to model simply the action potential behavior of the nerve cell, these models are not capable of emulating completely biologic nerve cell behavior. Further, a single threshold logic gate cannot implement an XOR function. The lack of synthesis procedures limits this logic to adapt in modern logic design procedures. Attempts to use either of these models to create useful automata based on neuronal signaling have failed.

These failures extend past the creation of useful automata. Threshold logic, as applied to neural networks, led to neural net circuits whose dynamics are neither controllable nor observable due to the analog nature of the components. Specifically, because analog systems are flow through systems, an observer cannot tell exactly what it is doing something and when it would do such. Threshold gates further fail to model with any success inhibitory mechanisms in human nerve cells.

To date modern research in neurobiology has contributed to further understanding nerve cell signaling and uncovering vast complexities in synaptic organizations. To this effect, elaborate structures in chemical synaptic connections with extensive contacts between cells have also been observed. The perception that an axon terminating onto a single synapse has consequently been revised. To date, there has not been a logic circuit based on the electrochemical communication between cells.

SUMMARY OF THE INVENTION

An automaton may be constructed digitally, modeled on the ability of nerve cells to operate at a plurality of discrete electrochemical states. The automaton of the present invention may comprise a plurality of inputs. To make the automaton more adaptable to represent synaptic arrangements more complex than the ones modeled by threshold logic, these inputs may each be weighted independently of the others, or weights may be assigned to combinations of inputs, also reflecting the biological phenomena of coupling between presynaptic terminals. These weighted inputs are fed into a state computing unit. An output is generated by the state computing unit. The output is simultaneously fed back to a weight computing unit together with the inputs of the automaton. The weight computing unit in turn controls dynamically the weights assigned to each input or combination of inputs. A digital clock drives the inputs, the state computing unit, and the weight computing unit.

The output of the automaton is thus a digital value having more than two state levels that more closely reflects the electrochemical communication between biologic neurons. With this automaton as a building block, more advanced neural architectures maybe constructed.

DETAILED DESCRIPTION OF THE PREFERRED EMBODIMENTS

The study of neurophysiology reveals that nerve cells communicate to one another on many levels. The most obvious form of communication is through an action potential, comprised of an electrical signal in a nerve cell. Once sufficient stimulus is applied to the nerve cell, the action potential is emitted down the axon of the nerve cell. This sort of signal is used mainly for long range signaling. For example, such a signal may be used from motoneurons to the central nervous system. It is upon this sort of communication that threshold logic gates were modeled. While permutations do exist within threshold logic gates such as a piecewise linear threshold gate and a sigmoid threshold gate, such threshold gates are analog in nature and do not exhibit a plurality of discrete states. Further, neural nets built of these sorts of electrical neurons still fail to show the ability for inferential thinking.

Figure 1:
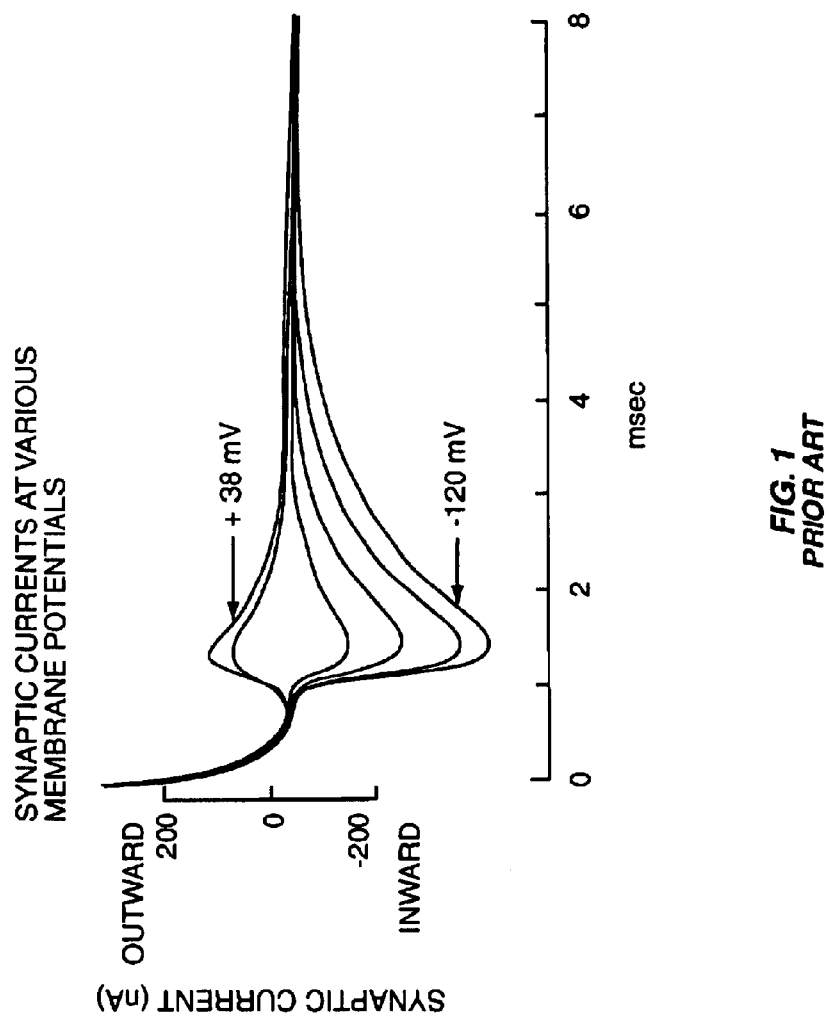
FIG. 1 illustrates a graph of synaptic currents at various membrane resting potentials in a nerve cell.

Another form of neural communication, ignored in large part by the proponents of artificial intelligence and automaton construction is the electrochemical communication across synapses. A brief discussion of this biologic phenomenon is in order. Nerve cells exhibit a natural electrical potential relative to their surroundings, called the resting potential. Almost all nerve cells are negative inside, having resting potentials in the range of −20 to −100 mV, with approximately −70 mV being typical. Information may be communicated between cells by variations in the potential of the cell. Such variations in the potential are achieved by the presence or absence of neurotransmitters that impact the action of the sodium pump and the diffusion of potassium across the cellular membrane. Variations in potentials result in current flow between cells. The "amount" of information communicated between cells is reflected in the graded size of the postsynaptic potential. Because neurons in the brain region are so tiny, with a body of a few microns in diameter, and close to each other with axons of a few tens of microns long, they do not use action potentials to conduct information, but rather currents that vary in size depending on the strength of the input stimulus that gave rise to them. FIG. 1 illustrates a number of ynaptic currents at various membrane potentials. Note that these currents decay with time and reflect a minute current flow between cells as a result of change in potentials. However, this sort of communication has never been captured by neural net or automaton design because there has not been a good model with which to emulate this communication.

Research has shown that neurotransmitters which effectuate the change in the potential of the postsynaptic cell are released in discrete quanta by the presynaptic terminals of other cells. Further, the variations of the resting potential of the postsynaptic cell are found to be at discrete states (graded) as a result of the discrete quanta of neurotransmitters that cross the membrane of the postsynaptic cell. The output of the cell can no longer be interpreted as true or false, but rather as a quantity with which to be dealt. The discrete quantal nature of the release of neurotransmitters and the consequent graded postsynaptic potential lends itself to digital modeling.

Figure 2:
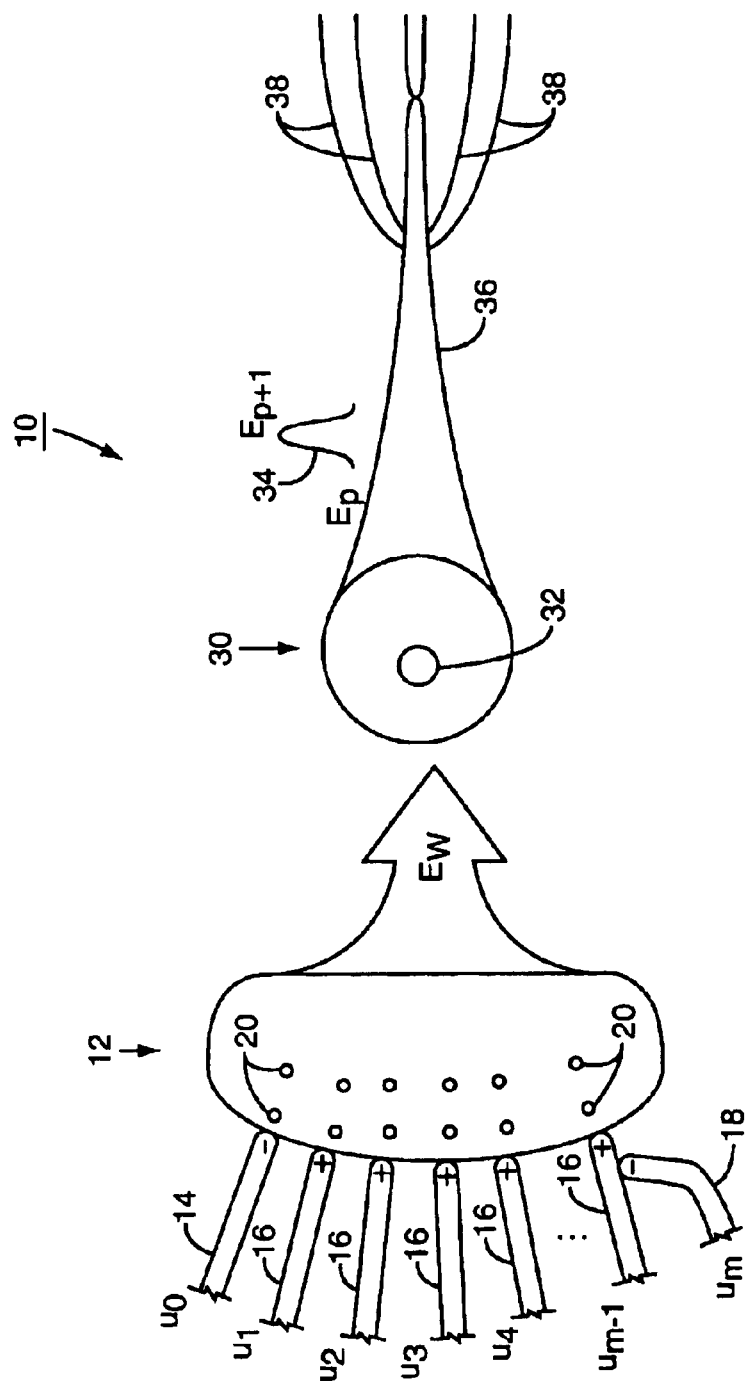
FIG. 2 illustrates a schematic version of a biologic nerve synapse.

For further assistance in understanding this biologic phenomenon, a synapse and the postsynaptic cell are illustrated in FIG. 2. A synaptic junction 10 comprises a synapse 12, a number of presynaptic terminals 14, 16, and a postsynaptic cell 30. Presynaptic terminals may be inhibitory presynaptic terminals 14 or excitatory presynaptic terminals 16. Further, excitatory presynaptic terminals 16 may be inhibited by a presynaptic terminal inhibitor 18. This activity reflects a coupling between the inputs. Presynaptic terminals 14, 16 release quanta of neurotransmitters 20 into the synapse 12 from which the postsynaptic cell 30 receives them. Further, the function of inhibitory synaptic terminal 18 ($u_m$) is to reduce or block the output from presynaptic terminal 16 ($u_{m-1}$). Excitatory presynaptic terminals 16 release neurotransmitters that raise the resting potential in the postsynaptic cell 30 and inhibitory presynaptic terminals 14 release neurotransmitters that lower the resting potential in the postsynaptic cell 30. The combination of both excitatory and inhibitory terminals results in a graded potential. Each presynaptic terminal 14, 16, 18, represented by $u_i$, may be a one or zero. A value of one means that the terminal in question is conducting. Conversely, a value of zero means that the terminal in question is not conducting.

Postsynaptic cell 30 includes a cell membrane 32, an axon 36, and a plurality of connection branches 38. The introduction of the neurotransmitters 20 across the cell membrane 32 of the postsynaptic cell 30 causes an electrochemical reaction that changes the potential of the cell membrane 32. The resulting potential variations 34 propagate down the axon 36 to the connection branches 38 where neurotransmitters 20 may be released again across another synapse (not shown). In FIG. 2, $E_p$ represents the normal resting potential of the cell 30. $E_w$ is the equivalent of the electrochemical energy carried by the quanta of neurotransmitters 20 released by all active presynaptic terminals 14, 16, either excitatory or inhibitory. When these quanta of neurotransmitters enter the membrane 32 with an energy equal to $E_w$, there is a movement of ions which gives rise to a pulse of potential amplitude $E_{p+1}$ measurable in terms of current and voltage. Thus, $E_{p+1}$ may be expressed as follows:

$$E_{p+1} = E_p + E_w \qquad (1)$$

Figure 3:
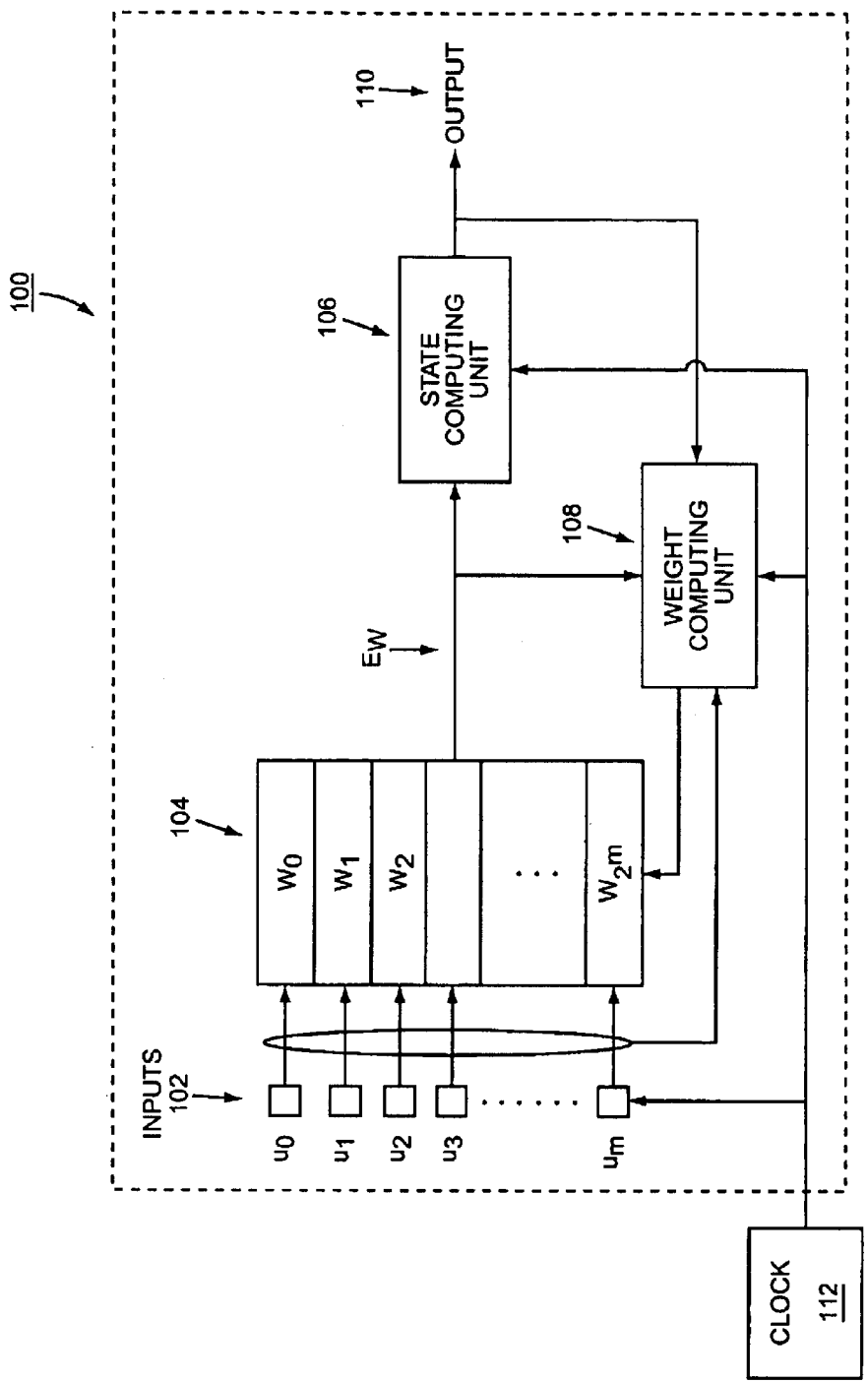
FIG. 3 illustrates the automaton of the present invention.

The present invention lies in its ability to model the electrochemical communication exhibited by cells as described with respect to FIG. 2. Reference is made to FIG. 3, wherein the structure of an automaton 100 of the present invention is illustrated. Automaton 100 comprises a plurality of m inputs 102, a weight storage unit 104, a state computing unit 106, a weight computing unit 108, and an output 110. A clock 112 may provide a clock signal from a point external to the automaton 100.

There may be up to m inputs 102, denoted in FIG. 3 as $u_i$, $0 \leq i \leq m$. Each of the inputs 102 may take on values of zero or one. An active input is set at a one. This mimics the biologic cell described above. Inputs 102 may be assembled into patterns. If there are m inputs 102, then there could be up to $2^m$ different input patterns as stimulus.

To model effectively the coupling between inputs, weight storage unit 104 has up to $2^m$ weight elements $w_{i'}$, $0 \leq i' \leq 2^m$, that are controlled by the weight computing unit 108. $w_{i'}$ models the variable number of quanta of neurotransmitters released by the presynaptic terminals. The output of the weight storage unit 104 is intended to act as the equivalent of $E_w$ described above. In particular, $E_w$, in this context, may be expressed as follows:

$$E_w = \sum_j [w_j * f_j(u_i)] \qquad (2)$$

where $f_j(u_i)$ represents the jth pattern of input terminals contributing to $E_w$ and $w_j$ represents the weights that correspond to that given pattern of inputs. For example, all inputs could be weighted with a single weight $w_o$; some portion of the inputs could be weighted with $w_1$, another portion with $w_2$; every input could have its own weight, or any variation thereof. The use of $f_j(u_i)$ allows the present invention to model various patterns of synaptic arrangements and also model coupling between presynaptic terminals.

State computing unit 106 mimics the cell membrane where the electrochemical interaction takes place. State computing unit 106 generates an output at output 110. Output 110 represents a finite set of output terminals from the state computing unit 106, each one taking on values of zero or one. This represents the digitized resting potential of the automaton 100. This may be an n-bit digital value. n may be arbitrarily assigned and is determined by the number of state levels that the automaton 100 can output. That value can be fed as is, or encoded (to emulate current digital computing) before being passed to another automaton 100. The output of state computing unit 106 represents $E_{p+1}$ and equation 1, above, is the source of this output.

Weight computing unit 108 receives the inputs 102 prior to weighting as well as receives the output of state computing unit 106. Weight computing unit 108 may evaluate $E_w$ prior to introduction at the state computing unit 106. Finally, weight computing unit 108 may dictate what weights $w_{i'}$ are placed in weight storage unit 104. Usually, the weight computing unit 108 first computes the weights, perhaps arbitrarily, and stores them in the weight storage unit 104. Weight computing unit 108 will update the weights during learning, as discussed below, or as needed to alter the output at output 110 so as to fall within a predefined state level band as desired.

Clock 112 forces automaton 100 to act as a discrete time system. Clock 112 is connected to the inputs 102, the state computing unit 106, and the weight computing unit 108. Clock 112 has a period of Δt that corresponds to the amount of time the state computing unit 106 takes to calculate the output $E_{p+1}$ from the weighted inputs $E_w$. For example, if a set of inputs are received at inputs 102 at time $t_0$, state computing unit 106 outputs a signal at output 110 at time $t_0 + \Delta t$. Clock 112 forces the synchronization of automaton 100. In particular, when the clock 112 sends a pulse, a fresh input pattern $f_j(u_i)$ is presented at inputs 102, weighted in weight storage unit 104, and fed into state computing unit 106. Upon receipt of this new input a new state level is generated by the state computing unit 106 according to a state transition function which combines equations (1) and (2) and is defined as follows:

$$E_p(t+\Delta t)=h[E_p(t), W(t), u(t)] \quad (3)$$

This computing architecture permits an output that is structured as a set of discrete state levels with positive and negative polarity, analogous to the membrane potential variations that occur during excitation and inhibition of a nerve cell. External input stimulus being a combination of excitatory and inhibitory inputs from the set $u_i$, will cause the occurrence of any state amongst the set. As input stimulus is applied with changing patterns, the automaton 100 will output a different state level from within the set available. This output defined between time t and time t+n' $\Delta t$ after some number of n' (note that n' has no relation to n mentioned above) different input patterns represents the state trajectory of the automaton 100 just like the cell's membrane outputs a train of pulses of different amplitudes. Consequently, for m number of input and output terminals, there could be up to $2^m$ different states within the output state trajectory. Each state trajectory represents a response in time of the internal state of the automaton 100.

It is well known in the study of neural nets to provide a learning function that trains the neural net to react, i.e., provide a desired output to given inputs. The same is true of the present invention. Automaton 100 is said to be in the learning mode when it is executing the following function:

$$w_j=g[f_j(u_i), E_p, E_{p+1}] \quad (1.4)$$

This learning function may be an error correction learning algorithm, a memory based learning algorithm, a Hebbian learning algorithm, a competitive learning algorithm, or even a Boltzmann learning algorithm if needed or desired. During the learning process, the weights can be altered discretely. Further, as this is a discrete system, the set of states can be traced backwards to observe how the system arrived at the final state.

If the automaton 100 is configured not to return to its original resting state as a normal biological cell does, the neuron may also synthesize Mealy and Moore automata as well. In such a configuration, the last $E_{p+1}$ remains the active state until changed by a new input pattern received at inputs 102.

The architecture of automaton 100, as illustrated in FIG. 3 may be implemented using an ASIC. Alternatively, it may equivalently be implemented using a microprocessor, a microcontroller, a programmable logic device (PLD), a Complex PLD (CPLD), a programmable Arithmetic Logic Unit (ALU), Field Programmable Gate Array (FPGA) or the like as needed or desired. Weight storage unit 104 may be implemented using static or dynamic RAM. Alternatively, it may be implemented with flash memory, ROM, EPROM, EEPROM, or the like as needed or desired. As yet another alternative, the entire automaton 100 may be modeled with software run by appropriately powered microprocessor.

The present invention is better suited to model nerve cell behavioral change than the previous threshold model. As such, the present invention constitutes an appropriate building block for artificial nervous systems architecture. Automaton 100, termed herein as a neuro-automaton, represents an upper level model of logic implemented as a discrete time system. Thus, multiple automata 100 may be assembled together, potentially communicating one with the others, with cascaded layers of automata 100 to build adaptive filters, perform logic and signal processing (just as brain cells do) and the like as needed or desired.

The present invention may also be used to synthesize an algorithmic state machine (a state machine that executes a sequence of states according to a predefined algorithm). The state-machine input-output relation is no longer expressed in terms of combinatorial expressions. Instead, state transitions are expressed in terms of discrete time expressions. This is superior to Boolean expressions and threshold logic expressions because of the analytical nature of discrete mathematics.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. An automaton comprising:

a plurality of inputs, each capable of assuming one of two states;

a weight storage unit operatively connected to said inputs;

a state computing unit operatively connected to said weight storage unit and having an output; and a clock operatively connected to and synchronously driving said inputs and said state computing unit;

said inputs forming a plurality of patterns;

said weight storage unit applying selected weights to different ones of said plurality of patterns;

said state computing unit receiving the weighted pattern of inputs from the weight storage unit to compute a new state level at the output, said output being one of a predetermined number of possible states greater than two and expressed as a digital value.

2. The automaton of claim 1 wherein said clock has a period comparable to a length of time required to produce an output in the state computing unit from a given set of inputs.

3. The automaton of claim 1 further comprising a weight computing unit for dynamically determining the weights within the weight storage unit.

4. The automaton of claim 3 wherein said weight computing unit is synchronously driven by said clock with said inputs and said state computing unit.

5. The automaton of claim 3 wherein said weight computing unit uses a learning function to determine the weights within the weight storage unit based on a given input and output.

6. The automaton of claim 3 wherein said weight computing unit receives the output from said state computing unit to select weights from said weight storage unit.

7. The automaton of claim 1 wherein different ones of said plurality of patterns models coupling behavior between inputs.

8. A method of controlling an automaton, comprising:

providing a plurality of inputs, each capable of being in one of two states, said plurality of inputs capable of forming a plurality of different patterns;

weighting a given pattern of inputs;

computing a digital output, said output being one of a predetermined number of possible states greater than two and expressed as a digital value; and using a clock to drive synchronously the inputs and the output.

9. The method of claim 8 further comprising teaching said automaton with a learning function.

10. An automaton comprising:

a plurality of m inputs, each capable of assuming one of two states;

a weight storage unit storing $2^m$ weights, said weight storage unit receiving a selected pattern of said inputs, and weighting said selected pattern of inputs;

a state computing unit receiving said weighted inputs and generating an output corresponding to one of a predetermined number greater than two of possible states and expressed as a digital value;

a weight computing unit receiving said output and said inputs and determining weights to be placed in said weight storage unit; and a clock synchronously driving said inputs, said state computing unit, and said weight computing unit.

11. The automaton of claim 10 wherein said clock comprises a period equivalent to a length of time required by said state computing unit to determine said output after receipt of said weighted inputs.

12. The automaton of claim 10 wherein said weight computation unit learns which weights to store in said weight storage unit based on a given pattern of inputs and outputs according to a learning function.

13. A discrete time neural net comprising a plurality of automata as described in claim 10.

14. An automaton comprising:

a plurality of m inputs $u_i$ capable of being assembled into $2^m$ patterns according to a function $f_j(u_i)$, where j lies between 1 and $2^m$;

a weight storage unit comprising $2^m$ weights w, selectively assigned to different ones of said $2^m$ patterns, said weight storage unit producing an output $$E_w = \sum_j [w_j * f_j(u_i)];$$

a state computing unit receiving $E_w$ and calculating an output $E_{p+1}=E_w+E_p$, where $E_p$ represents an initial state, said output corresponding to one of a predetermined number greater than two of possible states and expressed as a digital value;

a weight computing unit selectively determining weights $w_j$ to store in said weight storage unit; and a clock synchronously driving said weight computing unit, said inputs, and said state computing unit.

15. The automaton of claim 14 wherein said weight computing unit is trained according to a learning function.

16. The automaton of claim 15 wherein said state computing unit initially has an output of $E_p$.

17. The automaton of claim 16 wherein said learning function is a function of $f_j(u_i)$, $E_p$, and $E_{p+1}$.

* * * * *